US012768946B2

(12) United States Patent
Rigazio et al.

(10) Patent No.: US 12,768,946 B2

(45) Date of Patent: Oct. 20, 2026

(54) RADAR IDENTIFICATION OF PERSONS VIA VITAL SIGNS

(71) Applicant: Koko Home, Inc., Los Angeles, CA (US)

(72) Inventors: Luca Rigazio, Los Gatos, CA (US); Usman Mahmood Khan, Raleigh, NC (US)

(73) Assignee: Koko Home, Inc., Los Angeles, CA (US)

( * ) Notice: Subject to any disclaimer, the term of this patent is extended or adjusted under 35 U.S.C. 154(b) by 468 days.

(21) Appl. No.: 18/220,439

(22) Filed: Jul. 11, 2023

(65) Prior Publication Data

US 2024/0012109 A1 Jan. 11, 2024

Related U.S. Application Data

(60) Provisional application No. 63/359,943, filed on Jul. 11, 2022.

(51) Int. Cl.

*G01S 7/41* (2006.01)

*G01S 13/56* (2006.01)

(52) U.S. Cl.

CPC .............. *G01S 7/412* (2013.01); *G01S 13/56* (2013.01); *G01S 7/417* (2013.01)

(58) Field of Classification Search

CPC ........... G01S 7/412; G01S 13/56; G01S 7/417

See application file for complete search history.

(56) References Cited

U.S. PATENT DOCUMENTS

| | | | | |
|---|---|---|---|---|
| 2012/0068819 | A1* | 3/2012 | McGrath | G07C 9/37 340/5.82 |
| 2015/0157239 | A1* | 6/2015 | Rissacher | A61B 5/318 600/407 |
| 2018/0106897 | A1* | 4/2018 | Shouldice | G01S 13/56 |
| 2019/0391250 | A1* | 12/2019 | Cohen | G01S 13/87 |
| 2020/0121215 | A1 | 4/2020 | Hyde et al. | |
| 2020/0249314 | A1 | 8/2020 | Eshet et al. | |
| 2020/0264278 | A1 | 8/2020 | Eckert et al. | |
| 2020/0386879 | A1 | 12/2020 | Shouldice et al. | |
| 2021/0197834 | A1* | 7/2021 | Shaker | B60W 40/08 |

(Continued)

OTHER PUBLICATIONS

"International Application Serial No. PCT US2023 027349, International Search Report mailed Sep. 27, 2023", 2 pgs.

(Continued)

*Primary Examiner* — Timothy A Brainard

*Assistant Examiner* — Hailey R Le

(74) *Attorney, Agent, or Firm* — Schwegman Lundberg & Woessner, P.A.

(57) ABSTRACT

A radar apparatus comprises: a processor; a radar; and a non-transitory memory storing instructions that, when executed by the processor, configure the apparatus to perform a method. The method comprises: emitting a radar signal with the radar; receiving backscattered radar signals with the radar; extracting reflection data from the backscattered radar signal; determining at least one vital sign of at least one person from the extracted reflection data; and identifying the at least one person by using a first machine learning model to provide a similarity score between the determined at least one vital sign and at least one vital sign from previously collected vital signs of the at least one person.

19 Claims, 12 Drawing Sheets

(56) References Cited

U.S. PATENT DOCUMENTS

| | | | | |
|---|---|---|---|---|
| 2021/0321938 | A1* | 10/2021 | Hristov | A61B 5/1118 |
| 2021/0326660 | A1* | 10/2021 | Krishnan | G06F 18/214 |
| 2021/0361172 | A1* | 11/2021 | Fornell | A61G 7/0527 |
| 2022/0071535 | A1 | 3/2022 | Jernigan | |
| 2022/0083120 | A1* | 3/2022 | Ghoshal | G01S 13/56 |
| 2023/0157646 | A1* | 5/2023 | Rigazio | A61B 5/7267 600/408 |
| 2023/0350004 | A1* | 11/2023 | Cnaan-On | G01S 13/42 |

OTHER PUBLICATIONS

"International Application Serial No. PCT US2023 027349, Written Opinion mailed Sep. 27, 2023", 10 pgs.
"FCC Equipment Test Report of 10.525 GHz field disturbance sensor in SleepScore Max Bedside Monitor", Compliance Engineering Ireland LTD, (Sep. 20, 2013), 25 pgs.
"International Application Serial No. PCT US2023 027349, International Preliminary Report on Patentability mailed Jan. 23, 2025", 12 pgs.

* cited by examiner

RADAR IDENTIFICATION OF PERSONS VIA VITAL SIGNS

CROSS-REFERENCE TO RELATED APPLICATIONS

This application claims the benefit of priority to and incorporates by reference U.S. Patent Application No. 63/359,943 filed Jul. 11, 2022.

TECHNICAL FIELD

This disclosure relates to radar and more particularly, but not exclusively, to determining identification of a person using radar to measure vital signs.

BACKGROUND

A radar system comprises a transmitter producing electromagnetic waves in the radio or microwaves domain, at least one transmitting antenna, at least one receiving antenna (often the same antenna is used for transmitting and receiving) and a receiver and processor to determine properties of the objects. Radio waves (pulsed or continuous) from the transmitter reflect off the objects and return to the receiver, giving information about the objects' locations and speeds.

BRIEF SUMMARY

A radar apparatus comprises: a processor; a radar; and a non-transitory memory storing instructions that, when executed by the processor, configure the apparatus to perform a method. The method comprises: emitting a radar signal with the radar; receiving backscattered radar signals with the radar; extracting reflection data from the backscattered radar signal; determining at least one vital sign of at least one person from the extracted reflection data; and identifying the at least one person by using a first machine learning model to provide a similarity score between the determined at least one vital sign and at least one vital sign from previously collected vital signs of the at least one person.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
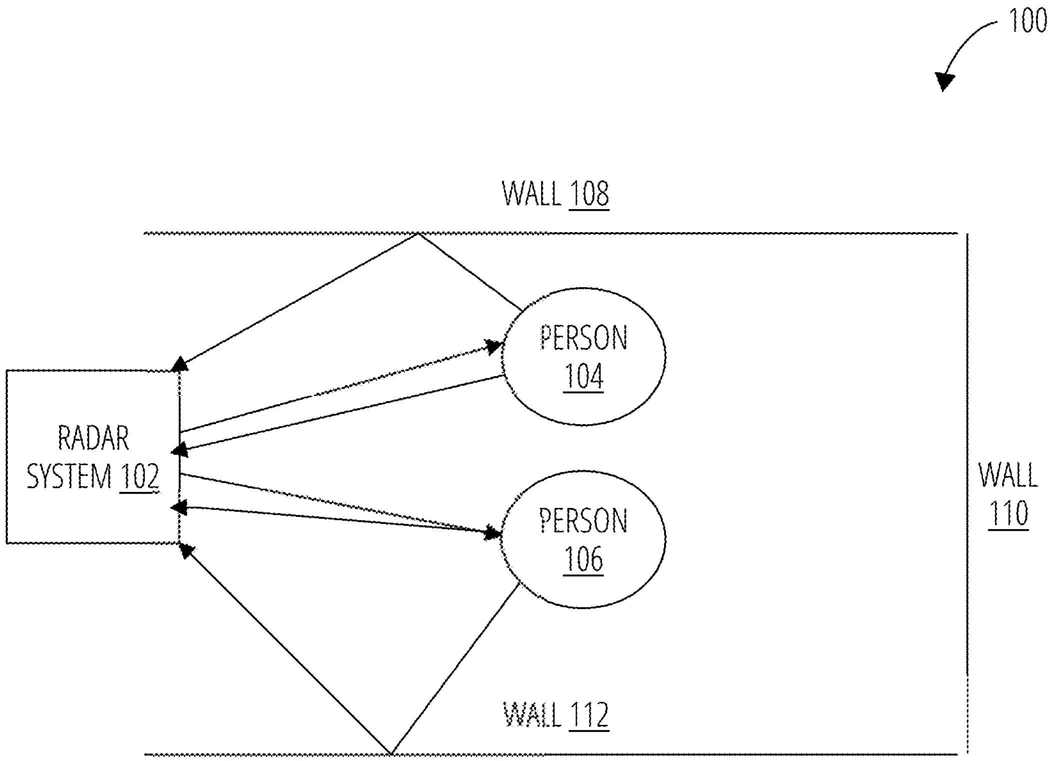
FIG. 1 illustrates an interior space having a radar system in accordance with one example.

FIG. 1 illustrates an interior space 100 (e.g., bedroom) having a radar system 102 in accordance with one example. As illustrated, the 100 has three walls: wall 108, wall 110, and wall 112. Within the interior space 100 are two persons: person 104 and person 106 that are irradiated by the radar system 102 with electromagnetic signals, e.g., radiofrequency (RF) signals. The RF signals reflect back to the radar system 102 directly and by bouncing off of the wall 108 and wall 112 (multipath). Note that while only two multipath and two direct path reflections are illustrated, there may be additional reflections. Further, while only two persons are shown, there may be additional persons, animals, and other moving objects (e.g., fans). There may also be stationary objects, such as furniture (not shown), that may cause additional multipath reflections.

In this example, the radar system 102, as will be discussed in further detail below, identifies that there are two different persons in the radar's view by extracting radar reflections from reflected radar data 302 corresponding to the person 104 and the person 106. The radar system 102 also determines the identification for each set of reflections. This will inform who person 104 and person 106 are, e.g., identities 304.

Figure 2:
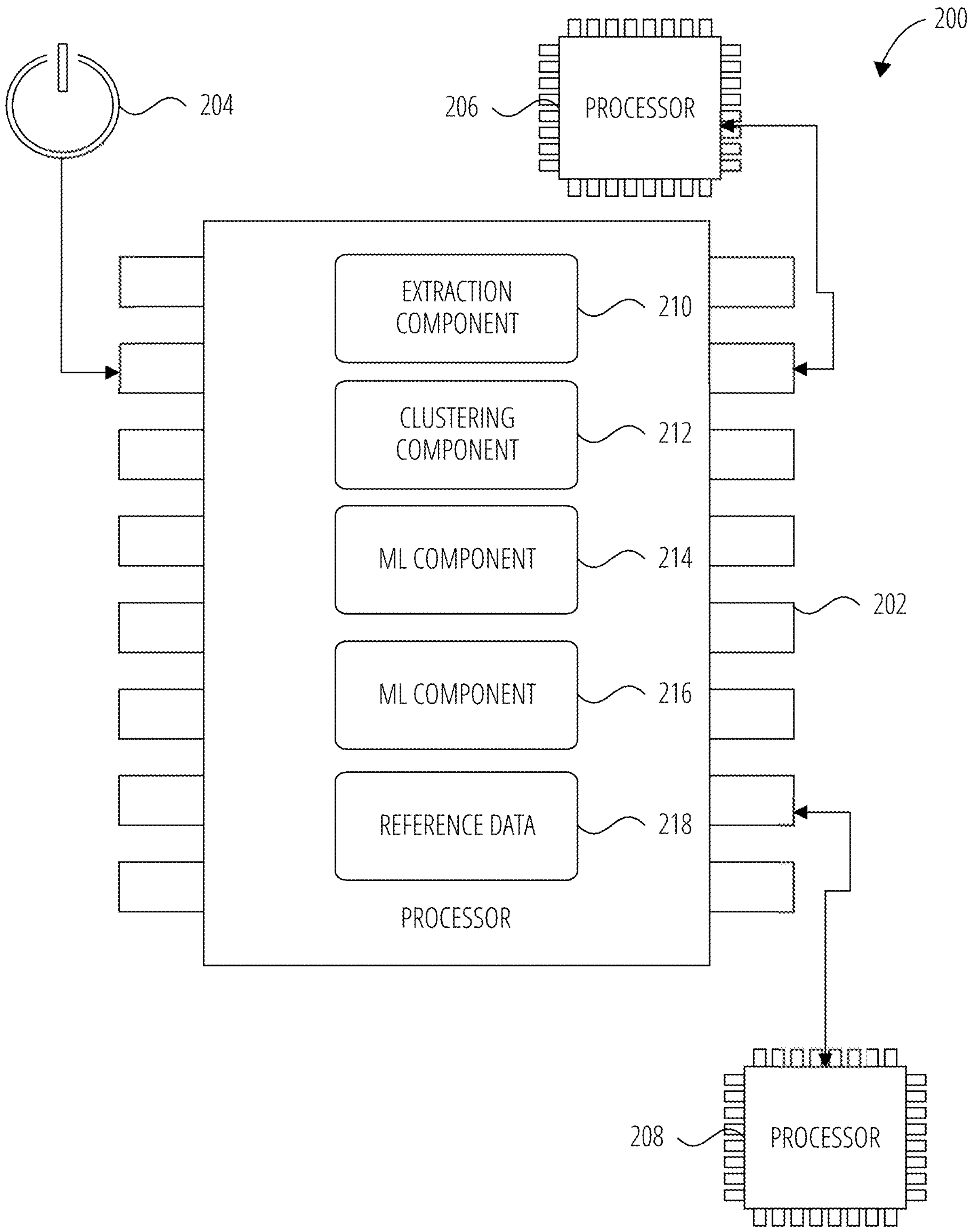
FIG. 2 is a diagrammatic representation of a processing environment, in accordance with some examples.

Turning now to FIG. 2, a diagrammatic representation of a processing environment 200 of the radar system 102 is shown, which includes a processor 206, a processor 208, and a processor 202 (e.g., a GPU, CPU, AI-optimized processor or combination thereof).

The processor 202 is shown to be coupled to a power source 204, and to include (either permanently configured or temporarily instantiated) components, namely an Extraction component 210, a Clustering component 212, an ML component 214, an ML component 216 and reference data 218.

As reflections from the same person have the same vital signs, the processing environment 200 can cluster radar reflections. For example, if a person has a BR of 20 bpm and HR of 65 bpm, then processing environment 200 will find this information in all the reflections from that person. Hence, by clustering the reflections based on vital signs, the processing environment 200 identifies all of the reflections of different persons.

The number of people is equal to the number of clusters. Consider an example where there are 2 people in the room, and 3 reflections corresponding to each person (total of 6 reflections). In this scenario, the processing environment 200 will obtain 2 clusters (with distinct vital signs), each comprising three reflections.

The extraction component 210 extracts reflections from radar data 302 from all persons within the interior space 100 including from direct and multipath reflections. The clustering component 212 clusters the direct and multipath reflections from each person together based on vital signs determined from the radar data 302 as determined by the ML component 214. For example, the person 104 may have Direct Reflection 1, Multipath Reflection 1 and Multipath Reflection 2. The person 106 may have a Direct Reflection 2 and a Multipath 3. That is, the number of direct reflections and multipath reflections for each person may not be equal.

Figure 4:
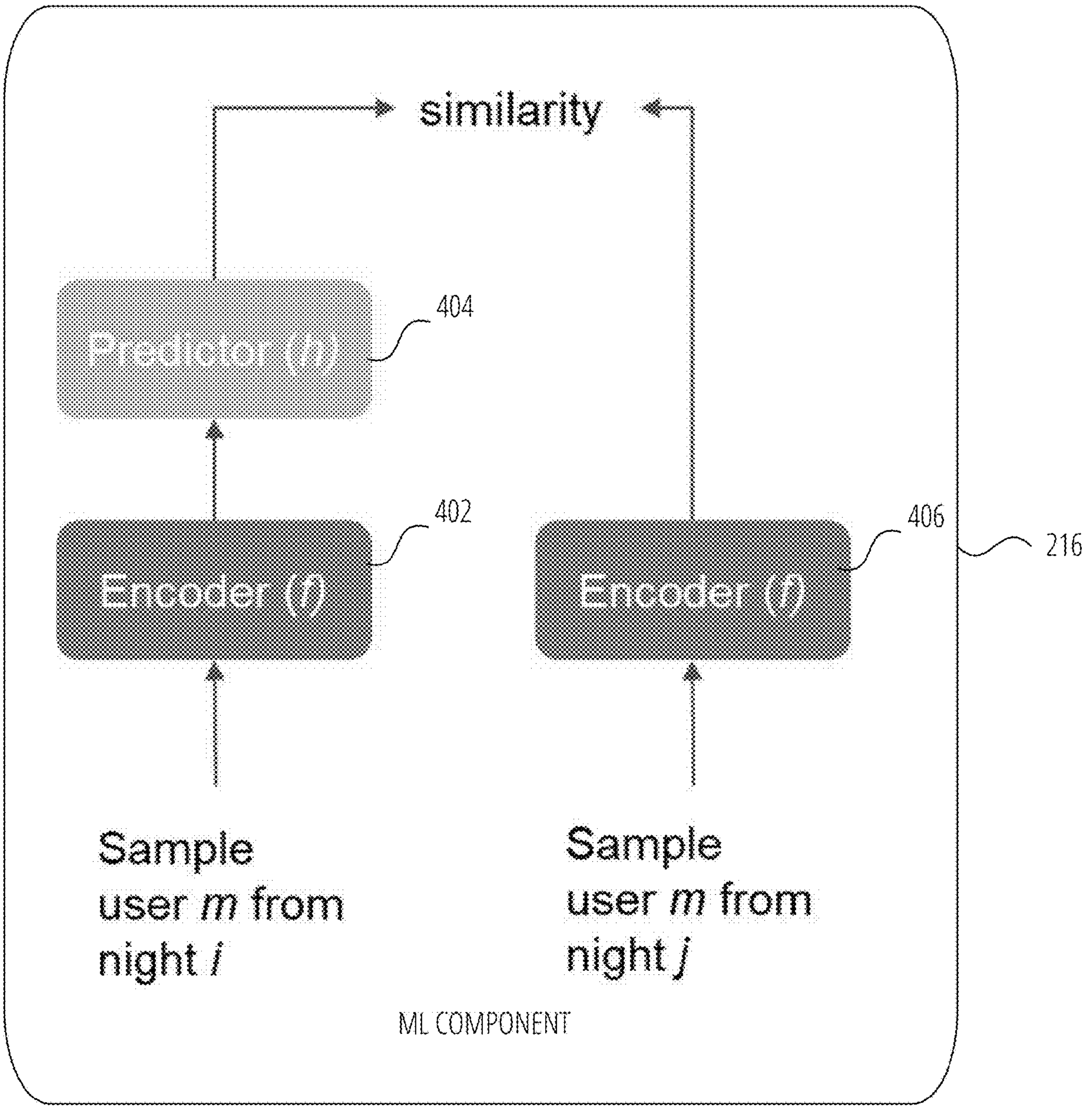
FIG. 4 illustrates a machine learning component, in accordance with an example.

The ML component 214 extracts vital signs from the radar data 302, e.g., as a photoplethysmography (PPG) waveform. The ML component 216, as will be discussed in further detail in conjunction with FIG. 4, compares the clustered vital signs to reference data 218 to determine the identities 304. The reference data 218 includes vital signs for each person collected beforehand (e.g., during onboarding). The reference data 218 can be used to train the ML component 216 or transferred learning from a database of vital signs may be used, as will be discussed further below.

Additional components (not shown) may include a monitoring component to monitor the identified persons' vital signs as measurements of activities of daily life, including sleep (pre-sleep in bed, different sleep staged such as light sleep, deep sleep and REM sleep, tossing and turning, waking, etc.). A feedback component can then provide feedback (e.g., Cognitive Behavioral Therapy for Insomnia (CBT-I)) to the identified person(s) to improve their sleep. In another example, an additional component may include an access component to provide access to a device, location, computer network, etc. based on the determined identities 304.

Figure 3:
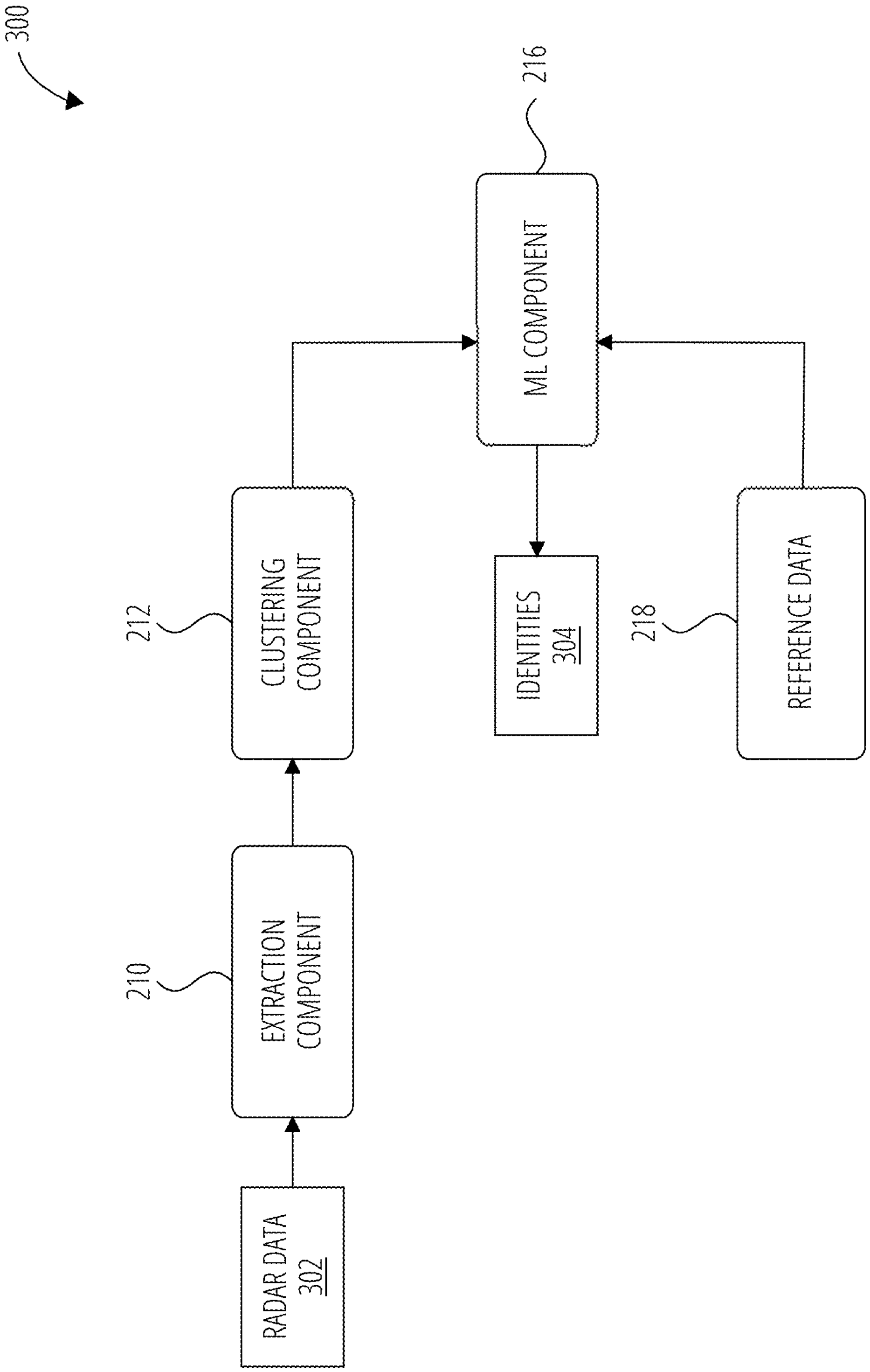
FIG. 3 illustrates data flow, in accordance with an example.

FIG. 3 illustrates a data flow 300, in accordance with an example. Received radar data 302, including direct path and multipath reflections are fed to the extraction component 210, which extracts the reflections. The clustering component 212 then clusters the reflections and the extracted vital signs from the clusters are fed to the ML component 216 to generate a similarity score based on reference data 218 of the persons. Based on the similarity scores, the identities 304 are determined.

FIG. 4 illustrates the ML component 216, in accordance with an example. The ML component 216 may include a self-supervised similarity model, e.g., using a SimSiam architecture. The reference data 218 containing vital signs collected during onboarding for a person may be fed into one of the encoders, e.g., the encoder 402, while current vital sign data can be fed into the encoder 406. The predictor 404 will then generate a similarity score indicating a potential match and thereby identifying a person. The encoder 402 and the encoder 406 embed higher dimensional data to lower dimensional data to get a vector while the predictor 404 then matches vectors. Note that a stop gradient can be applied to the encoder 406.

Figure 5:
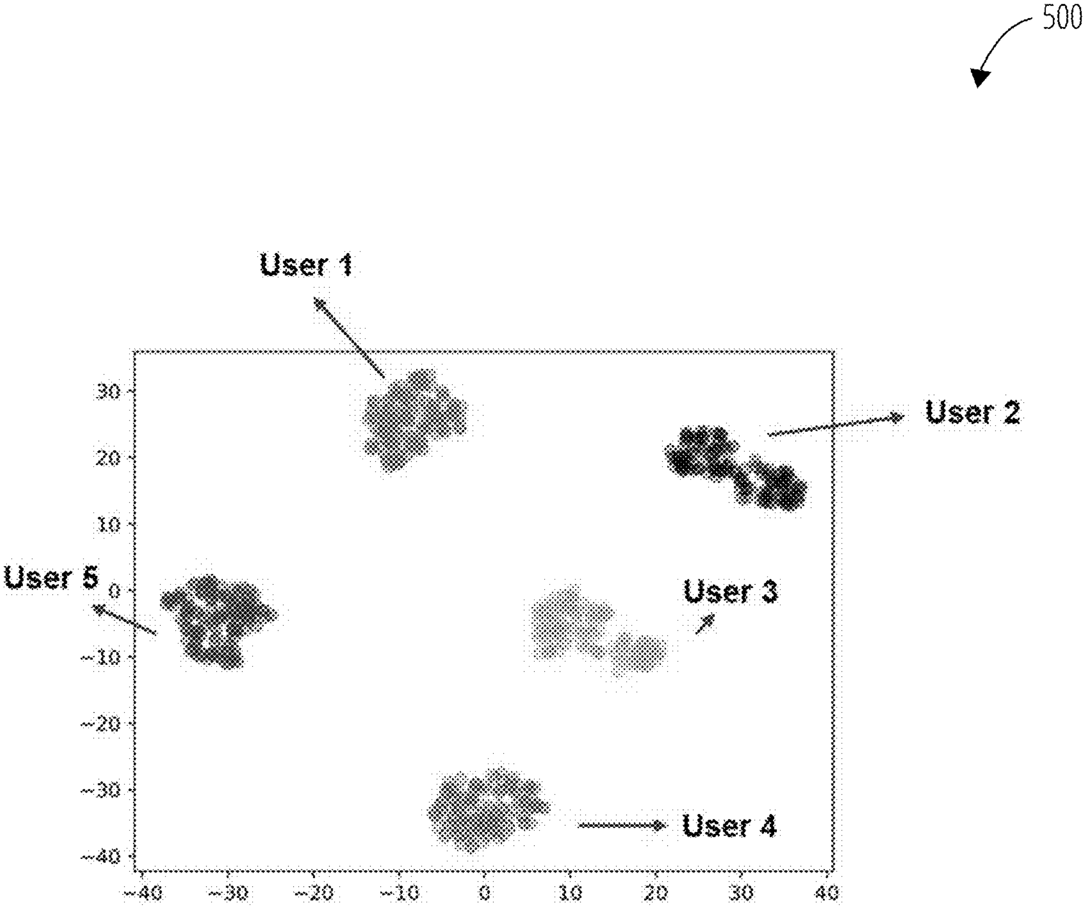
FIG. 5 illustrates mapping of persons in the interior space, in accordance with an example.

FIG. 5 illustrates mapping 500 of persons in the interior space, in accordance with an example. In this example, there are 5 persons within the interior space 100 based on clustering of radar reflections as determined by vital signs extracted from the radar reflections. Note that the radar system 102 may also map other objects including animals (pets) and other moving or vibrating objects (e.g., fans, robotic vacuums, etc.) and can optionally ignore some or all of the objects as not belonging to persons.

Figure 6:
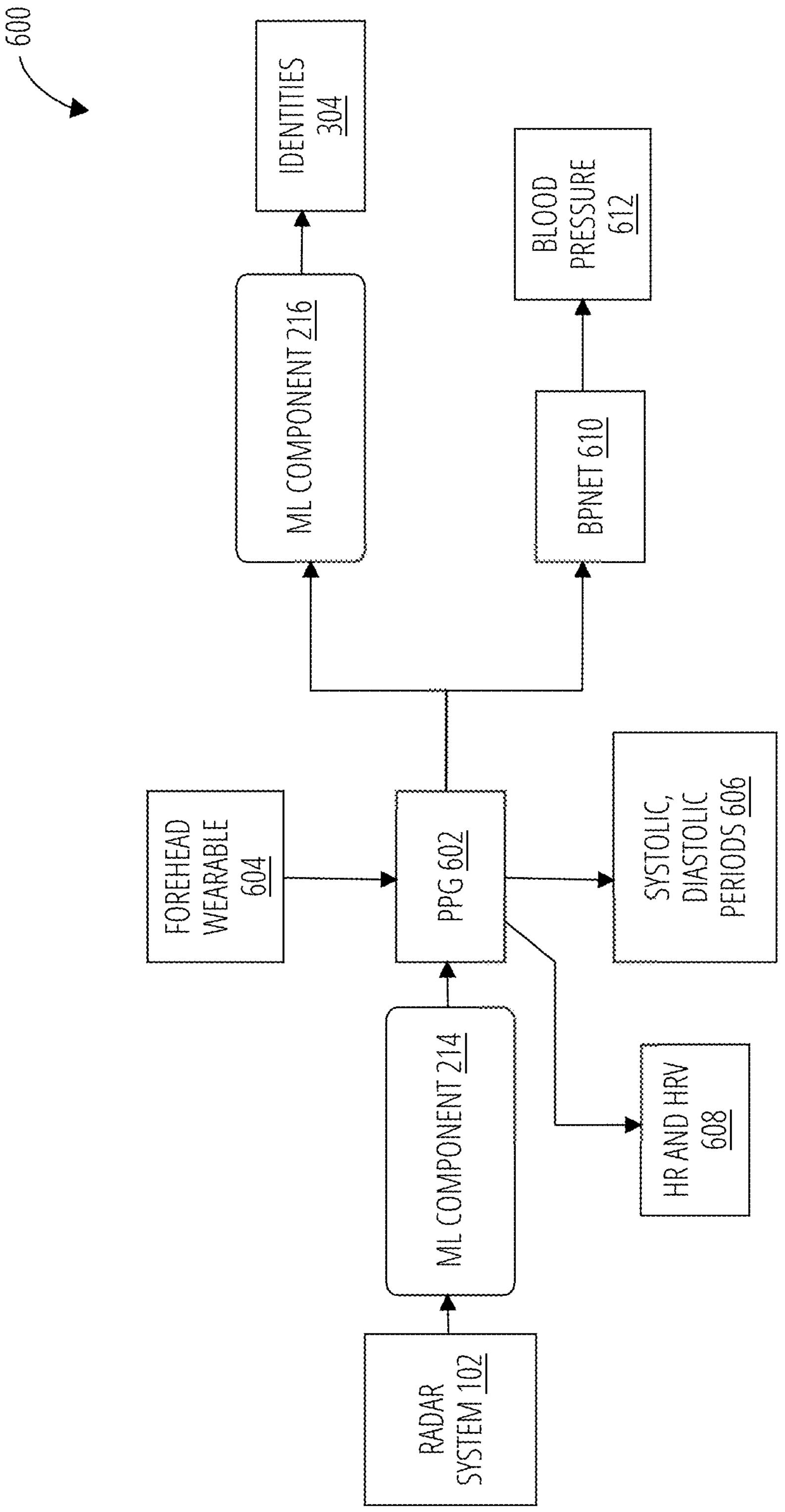
FIG. 6 illustrates data flow, in accordance with an example.

FIG. 6 illustrates data flow 600, in accordance with an example. Given the limited radar data from the reference data 218, radar system 102 can accelerate learning by transferring knowledge from a large public database of vital signs. For example, the radar system 102 can embed (representation) with the same self-supervised methods described above, on the vital-signs database (e.g., MIT MMIC database, a publicly available dataset developed by the Laboratory for Computational Physiology that comprises deidentified health data associated with thousands of intensive care unit admissions). The database may be used to pretrain the ML component 216. From this database, the ML component 216 obtains a PPG signal, which is the same type of signal output by the ML component 214.

One approach is to compare similarity between the PPG waveforms. As explained above, the ML component 216 is trained such that the similarity score is high when the two inputs are from the same user and low when the two inputs are from different users. Since this is a deep learning architecture, it may require a very large number of examples to learn this behavior. These examples need not be the specific persons to identify at run-time. Instead, the ML component 216 trains on examples of many different persons so that the resulting trained ML component 216 does not overfit on a few specific persons. In other words, the ML component 216 need not be trained to learn the signatures of specific persons. Instead, the ML component 216 is trained so it can identify if any two PPG signals belong to the same person. In practice, at run-time, the ML component 216 will obtain two different waveforms at two different timestamps, and then verify if they belong to the same person by checking if they have high similarity.

The ML component 214 takes radar data as input, and generates a PPG waveform, as described in U.S. patent application Ser. No. 17/992,031 filed Nov. 23, 2022 and incorporated herein by reference. A photoplethysmogram (PPG) is an optically obtained signal that can be used to detect blood volume changes in the microvascular bed of tissue. PPG is very commonly used in clinical evaluations. It is also measured by different wearables such as smartwatches. In one as aspect, in the data flows 600 PPG 602 in the reference data collection setup is collected through a forehead wearable 604. PPG 602 may include HR and HRV 608 and Systolic, Diastolic Periods 606. A BpNet 610 can also generate blood pressure 612. We use this reference PPG data to train the ML component 214 in conjunction with simultaneous radar data. Next, the ML component 216 identifies the person with the PPG signal as the model input.

Figure 7:
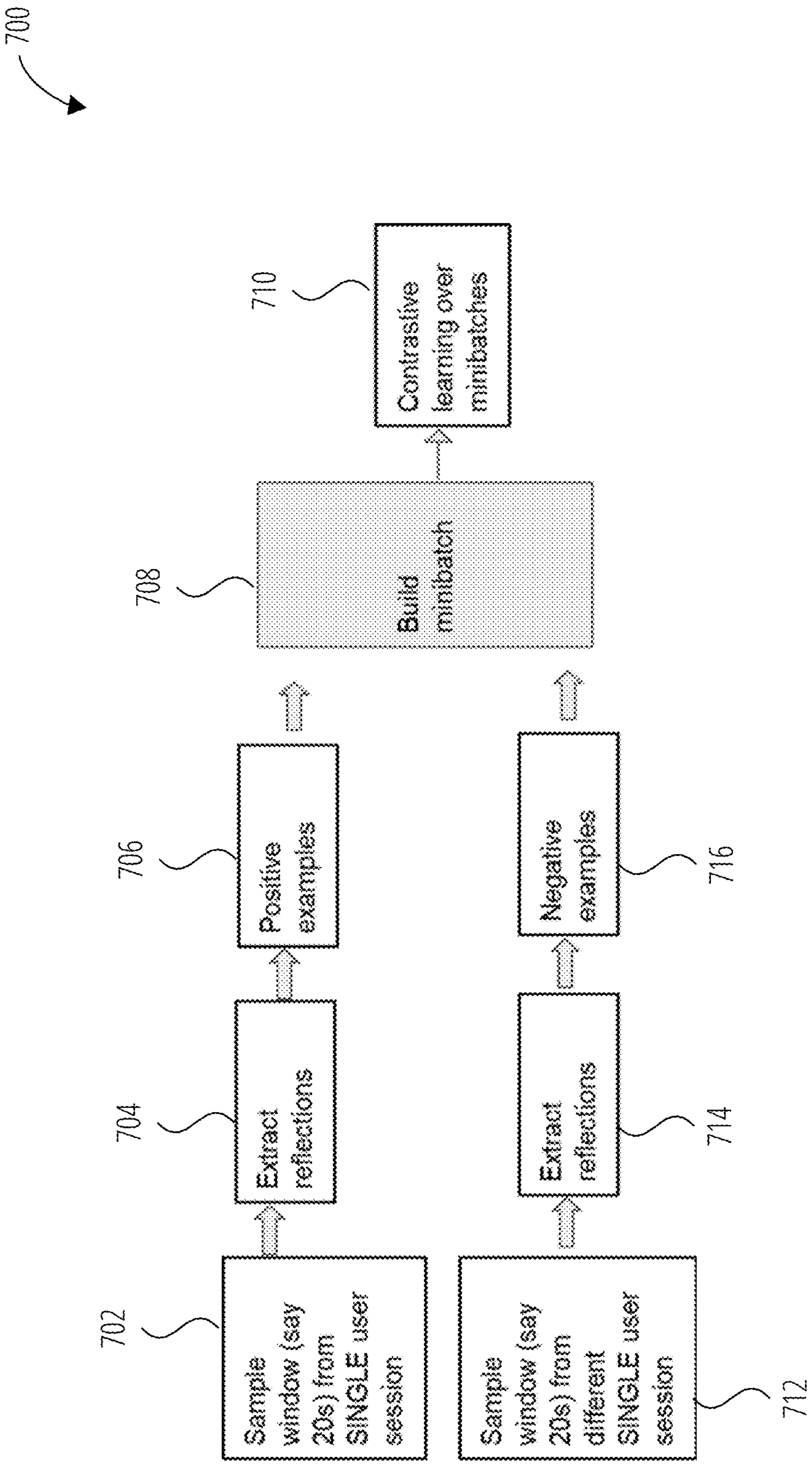
FIG. 7 illustrates data flow, in accordance with an example.

FIG. 7 illustrates data flow 700, in accordance with an example. The data flow 700 optionally uses contrastive learning to train the ML component 216. Radar samples can be taken over 20 s from two different users at blocks 702 and 712; reflections are extracted at blocks 704 and 714 generating positive examples and negative examples respectively at blocks 706 and 716. The examples are built into a minibatch at block 708 and then contrastive learning is performed at block 710.

Figure 8:
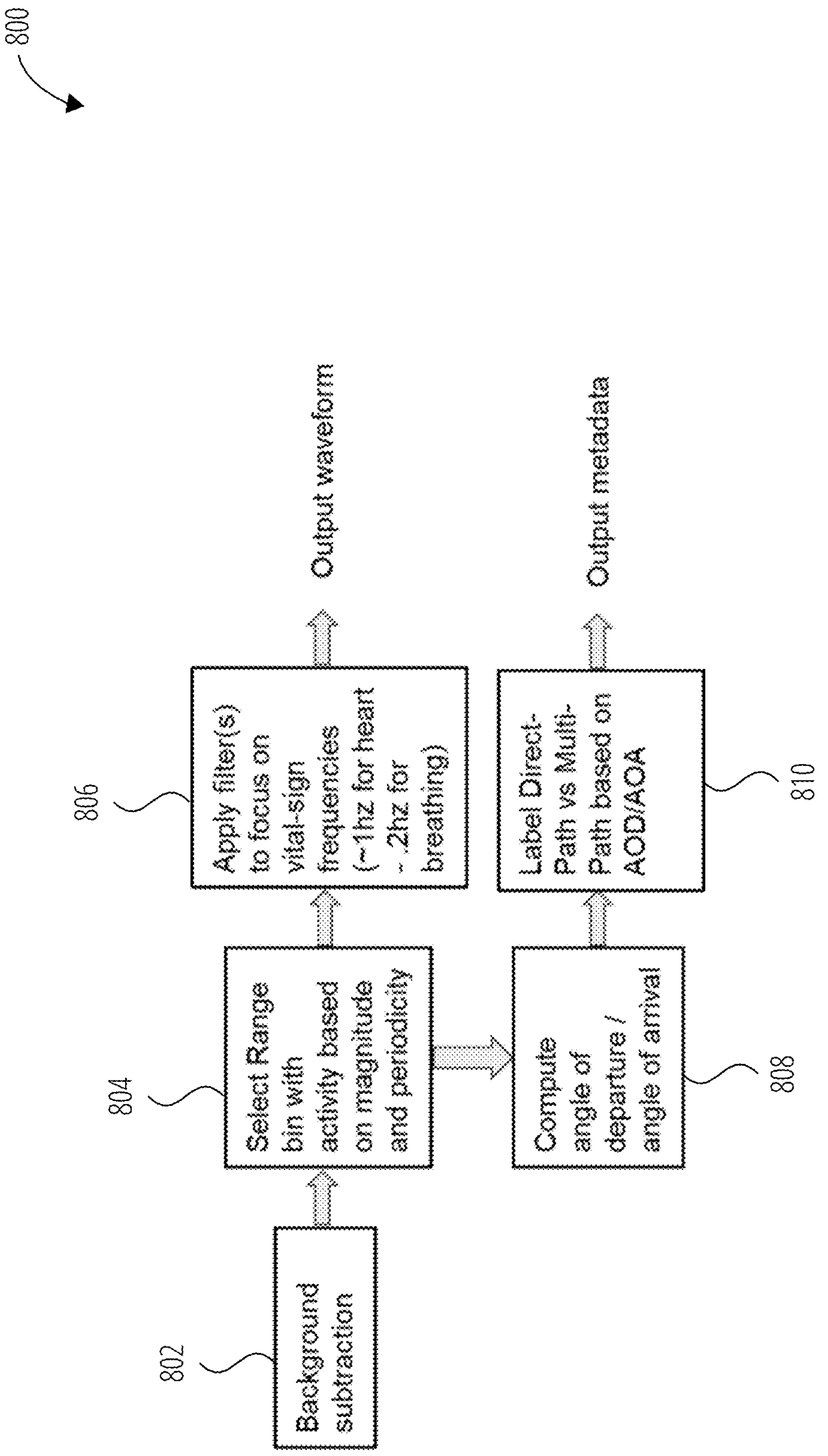
FIG. 8 illustrates data flow, in accordance with an example.

FIG. 8 illustrates data flow 800 for reflection extraction, in accordance with an example. Initially, background subtraction at block 802 can be performed, e.g., to remove radar signals that do not exceed a predefined signal to noise ratio. At block 804, a range bin with activity is selected based on magnitude and periodicity. At block 806, filters are applied to focus on vital sign frequencies and a waveform is output. Further, the angle of departure and arrival are computed at block 808 and then the reflection extraction data is labeled as direct path or multipath based on angle of arrival and departure. That metadata is then output.

Figure 9:
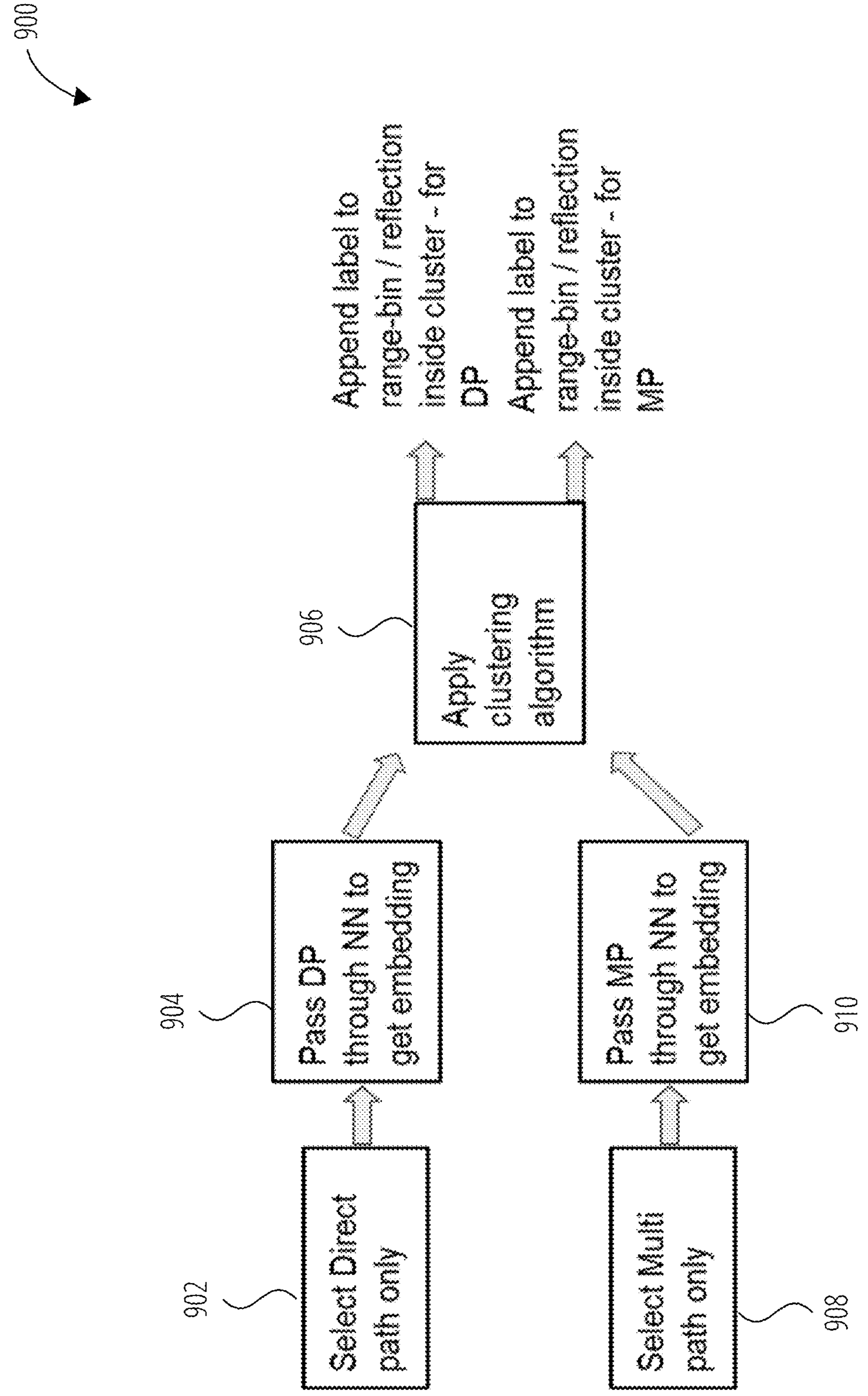
FIG. 9 illustrates data flow, in accordance with an example.

FIG. 9 illustrates data flow 900, in accordance with an example. Using data output from the data flow 800, the direct path data is selected at block 902 and fed through a neural network for embedding at block 904. Similarly, the multipath reflections are selected at block 908 and passed through a neural network at block 910 for embedding. A clustering algorithm is then applied to the embedded data at block 906 to get the clusters used for identification of persons.

Figure 10:
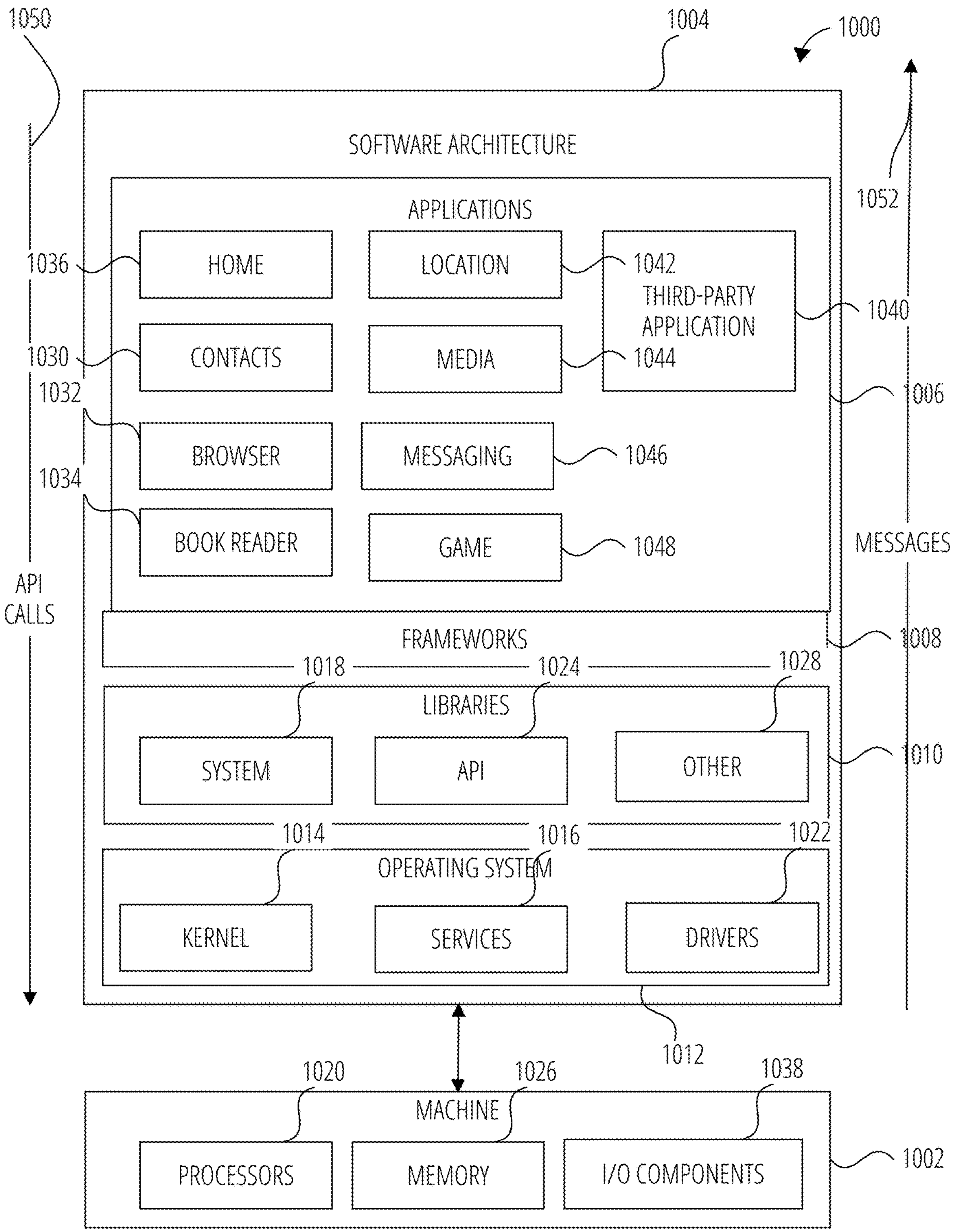
FIG. 10 is a block diagram showing a software architecture within which the present disclosure may be implemented, according to some examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, Processor management (e.g., scheduling), component management, networking, and security settings, among other functionalities. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, and power management drivers.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., Web Kit to provide web browsing functionality), and the like. The libraries 1010 can also include a wide variety of other libraries 1028 to provide many other APIs to the applications 1006.

The frameworks 1008 provide a high-level common infrastructure used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In some examples, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Figure 11:
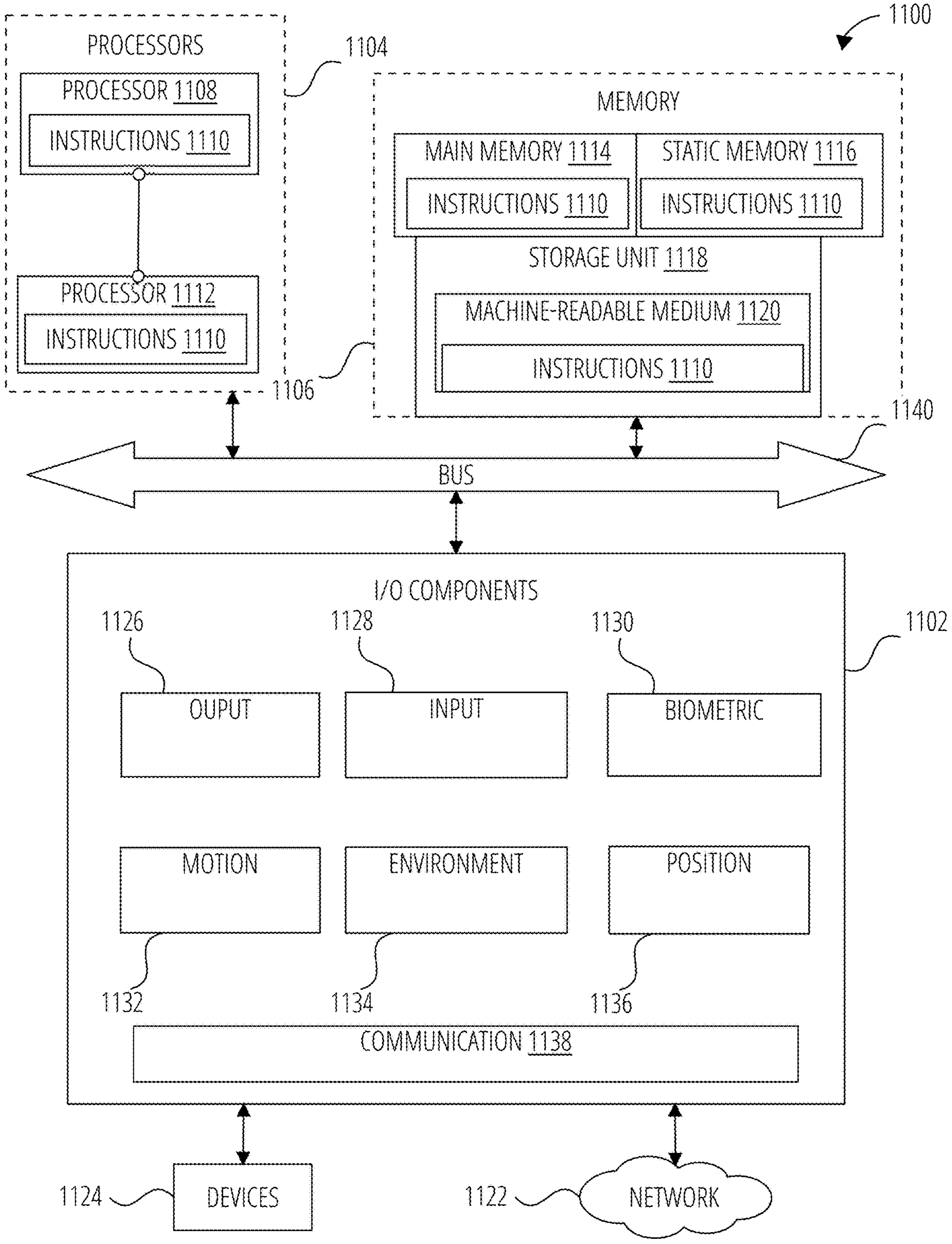
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1110 (e.g., software, a program, an application, an applet, an app, or other executable code) for causing the machine 1100 to perform any one or more of the methodologies discussed herein may be executed. For example, the instructions 1110 may cause the machine 1100 to execute any one or more of the methods described herein. The instructions 1110 transform the general, non-programmed machine 1100 into a particular machine 1100 programmed to carry out the described and illustrated functions in the manner described. The machine 1100 may operate as a standalone device or be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1110, sequentially or otherwise, that specify actions to be taken by the machine 1100. Further, while a single machine 1100 is illustrated, the term "machine" may include a collection of machines that individually or jointly execute the instructions 1110 to perform any one or more of the methodologies discussed herein.

The machine 1100 may include processors 1104, memory 1106, and I/O components 1102, which may be configured to communicate via a bus 1140. In some examples, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another Processor, or any suitable combination thereof) may include, for example, a Processor 1108 and a Processor 1112 that execute the instructions 1110. The term "Processor" is intended to include multi-core processors that may comprise two or more independent processors (sometimes referred to as "cores") that may execute instructions contemporaneously. Although FIG. 11 shows multiple processors 1104, the machine 1100 may include a single processor with a single core, a single processor with multiple cores (e.g., a multi-core processor), multiple processors with a single core, multiple processors with multiples cores, or any combination thereof.

The memory 1106 includes a main memory 1114, a static memory 1116, and a storage unit 1118, both accessible to the processors 1104 via the bus 1140. The main memory 1106, the static memory 1116, and storage unit 1118 store the instructions 1110 embodying any one or more of the methodologies or functions described herein. The instructions 1110 may also reside, wholly or partially, within the main memory 1114, within the static memory 1116, within machine-readable medium 1120 within the storage unit 1118, within the processors 1104 (e.g., within the processor's cache memory), or any suitable combination thereof, during execution thereof by the machine 1100.

The I/O components 1102 may include various components to receive input, provide output, produce output, transmit information, exchange information, or capture measurements. The specific I/O components 1102 included in a particular machine depend on the type of machine. For example, portable machines such as mobile phones may include a touch input device or other such input mechanisms, while a headless server machine will likely not include such a touch input device. The I/O components 1102 may include many other components not shown in FIG. 11. In various examples, the I/O components 1102 may include output components 1126 and input components 1128. The output components 1126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), or other signal generators. The input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1102 may include biometric components 1130, motion components 1132, environmental components 1134, or position components 1136, among a wide array of other components. For example, the biometric components 1130 include components to detect expressions (e.g., hand expressions, facial expressions, vocal expressions, body gestures, or eye-tracking), measure biosignals (e.g., blood pressure, heart rate, body temperature, perspiration, or brain waves), or identify a person (e.g., voice identification, retinal identification, facial identification, fingerprint identification, or electroencephalogram-based identification). The motion components 1132 include acceleration sensor components (e.g., accelerometer), gravitation sensor components, rotation sensor components (e.g., gyroscope). The environmental components 1134 include, for example, one or cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1136 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1102 further include communication components 1138 operable to couple the machine 1100 to a network 1122 or devices 1124 via respective coupling or connections. For example, the communication components 1138 may include a network interface Component or another suitable device to interface with the network 1122. In further examples, the communication components 1138 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1124 may be another machine or any of a wide variety of peripheral devices (e.g., a peripheral device coupled via a USB).

Moreover, the communication components 1138 may detect identifiers or include components operable to detect identifiers. For example, the communication components 1138 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Data glyph, Maxi Code, PDF417, Ultra Code, UCC RSS-2D bar code, and other optical codes), or acoustic detection components (e.g., microphones to identify tagged audio signals). In addition, a variety of information may be derived via the communication components 1138, such as location via Internet Protocol (IP) geolocation, location via Wi-Fi® signal triangulation, or location via detecting an NFC beacon signal that may indicate a particular location.

The various memories (e.g., main memory 1114, static memory 1116, and/or memory of the processors 1104) and/or storage unit 1118 may store one or more sets of instructions and data structures (e.g., software) embodying or used by any one or more of the methodologies or functions described herein. These instructions (e.g., the instructions 1110), when executed by processors 1104, cause various operations to implement the disclosed examples.

The instructions 1110 may be transmitted or received over the network 1122, using a transmission medium, via a network interface device (e.g., a network interface component included in the communication components 1138) and using any one of several well-known transfer protocols (e.g., hypertext transfer protocol (HTTP)). Similarly, the instructions 1110 may be transmitted or received using a transmission medium via a coupling (e.g., a peer-to-peer coupling) to the devices 1124.

Figure 12:
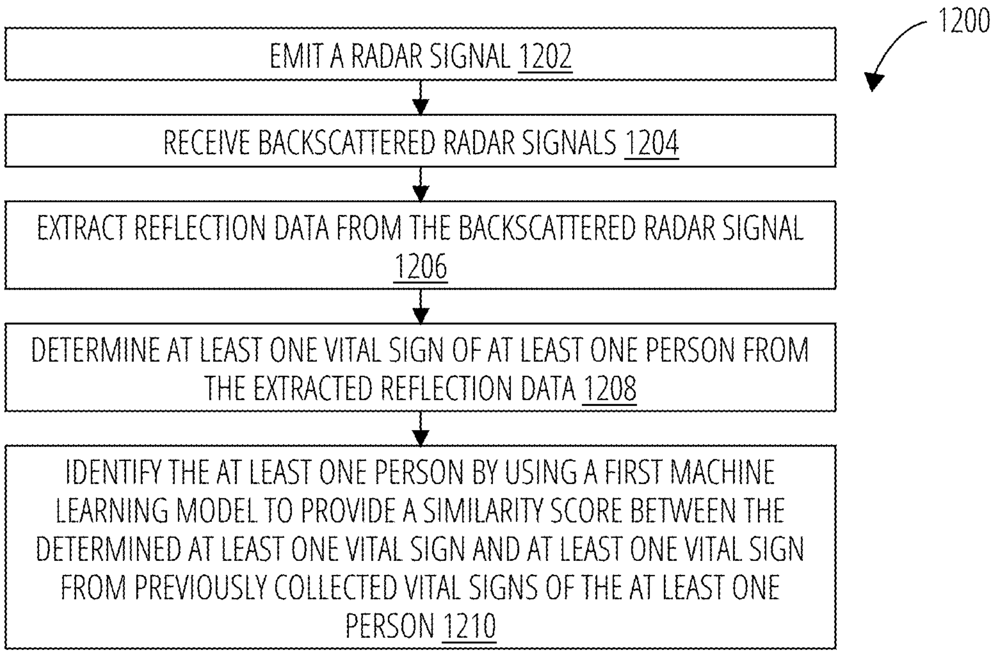
FIG. 12 illustrates a routine 1200 in accordance with one example.

FIG. 12 illustrates a routine 1200 in accordance with one example. The routine 1200 can be executed by the radar system 102 in one example. In block 1202, the radar system 102 emits a radar signal. In block 1204, the radar system 102 receives backscattered radar signals. In block 1206, the radar system 102 extracts reflection data from the backscattered radar signal. In block 1208, the radar system 102 determines at least one vital sign of at least one person from the extracted reflection data. In block 1210, the radar system 102 identifies the at least one person by using a first machine learning model to provide a similarity score between the determined at least one vital sign and at least one vital sign from previously collected vital signs of the at least one person. Note that the routine 1200 can have previously collected vital sign data for one or multiple persons and identify one or multiple persons using the previously collected vital sign data.

Note that once the person(s) are identified, the routine 1200 can include monitoring the identified person(s), e.g., for activities of daily life, sleep, etc. and provide feedback, e.g., CBT-I to improve sleep. For example, the routine 1200 can further comprise: (i) determining a parameter associated with an activity of daily life or sleep of the at least one person based on the received backscattered RF signals; and (ii) prescribing an action that, when carried out, modifies the parameter, resulting in an improvement of the activity of daily life or the sleep.

Alternatively, after identification, the radar system 102 can provide access if that identified person is authorized, e.g., to a network, computer, room, safe, etc. The radar identification may be the sole identification method or may be part of a multi-factor authorization (e.g., using a password, iris scan, key card, etc.).

The following examples describe various embodiments of methods, machine-readable media, and systems (e.g., machines, devices, or other apparatus) discussed herein.

1. A method, comprising:

emitting a radar signal;

receiving backscattered radar signals;

extracting reflection data from the backscattered radar signal;

determining at least one vital sign of at least one person from the extracted reflection data; and identifying the at least one person by using a first machine learning model to provide a similarity score between the determined at least one vital sign and at least one vital sign from previously collected vital signs of the at least one person.

2. The method of example 1, wherein the first machine learning model includes a self-supervised similarity model.

3. The method of any of the preceding examples, further comprising training a second machine learning model with photoplethysmogram data and corresponding radar data and wherein the determining at least one vital sign of at least one person from the extracted reflection data used the trained second machine learning model.

4. The method of any of the preceding examples, further comprising clustering the extracted reflection data based on vital signs determined from the extracted reflection data and wherein the identifying uses a first cluster of extracted reflection data from the clustering.

5. The method of any of the preceding examples, further comprising identifying a second person using a second cluster of extracted data from the clustering.

6. The method of any of the preceding examples, further comprising identifying a number of persons in a field of view of the emitted radar signal based on the clustering.

7. The method of any of the preceding examples, further comprising transferring learning to the first machine learning model from a database of vital signs.

8. The method of any of the preceding examples, wherein the first machine learning model is trained with contrastive learning.

9. The method of any of the preceding examples, wherein the extracted reflection data includes data from direct reflections and multipath reflections from the identified person.

10. A non-transitory computer-readable storage medium, the computer-readable storage medium including instructions that when executed by a radar system, cause the radar system to:

emit a radar signal;

receive backscattered radar signals;

extract reflection data from the backscattered radar signal;

determine at least one vital sign of at least one person from the extracted reflection data; and identify the at least one person by using a first machine learning model to provide a similarity score between the determined at least one vital sign and at least one vital sign from previously collected vital signs of the at least one person.

11. A radar apparatus comprising:

at least one processor;

a radar; and a non-transitory memory storing instructions that, when executed by the at least one processor, configure the apparatus to:

emit a radar signal with the radar;

receive backscattered radar signals with the radar;

extract reflection data from the backscattered radar signal;

determine at least one vital sign of at least one person from the extracted reflection data; and identify the at least one person by using a first machine learning model to provide a similarity score between the determined at least one vital sign and at least one vital sign from previously collected vital signs of the at least one person.

12. The apparatus of example 11, wherein the first machine learning model includes a self-supervised similarity model.

13. The apparatus of any of the preceding examples, wherein the instructions further configure the apparatus to train a second machine learning model with photoplethysmogram data and corresponding radar data and wherein the determining at least one vital sign of at least one person from the extracted reflection data used the trained second machine learning model.

14. The apparatus of any of the preceding examples, wherein the instructions further configure the apparatus to cluster the extracted reflection data based on vital signs determined from the extracted reflection data and wherein the identifying uses a first cluster of extracted reflection data from the clustering.

15. The apparatus of any of the preceding examples, wherein the instructions further configure the apparatus to identify a second person using a second cluster of extracted data from the clustering.

16. The apparatus of any of the preceding examples, wherein the instructions further configure the apparatus to identify a number of persons in a field of view of the emitted radar signal based on the clustering.

17. The apparatus of any of the preceding examples, wherein the instructions further configure the apparatus to transfer learning to the first machine learning model from a database of vital signs.

18. The apparatus of any of the preceding examples, wherein the first machine learn model is trained with contrastive learning.

19. The apparatus of any of the preceding examples, wherein the extracted reflection data includes data from direct reflections and multipath reflections from the identified person.

20. The apparatus of any of the preceding examples, wherein the instructions further configure the apparatus to:
(i) determine a parameter associated with an activity of daily life or sleep of the at least one person based on the received backscattered RF signals; and
(ii) prescribe an action that, when carried out, modifies the parameter, resulting in an improvement of the activity of daily life or the sleep.

Glossary

"Carrier Signal" refers to any intangible medium capable of storing, encoding, or carrying instructions for execution by the machine, and includes digital or analog communications signals or other intangible media to facilitate communication of such instructions. Instructions may be transmitted or received over a network using a transmission medium via a network interface device.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner In examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. A decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of methods described herein may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In some examples, the processors or processor-implemented components may be distributed across a number of geographic locations.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine-Storage Medium" refers to a single or multiple storage devices and/or media (e.g., a centralized or distributed database, and/or associated caches and servers) that store executable instructions, routines and/or data. The term includes solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium", "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Module" refers to logic having boundaries defined by function or subroutine calls, branch points, Application Program Interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). The various operations of example methods and routines described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Signal Medium" refers to any intangible medium that is capable of storing, encoding, or carrying the instructions for execution by a machine and includes digital or analog communications signals or other intangible media to facilitate communication of software or data. The term "signal medium" may o include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
- emitting a radar signal;
- receiving backscattered radar signals;
- extracting reflection data from the backscattered radar signal;
- determining at least one vital sign of at least one person from the extracted reflection data;
- identifying the at least one person by using a first machine learning model to provide a similarity score between the determined at least one vital sign and at least one vital sign from previously collected vital signs of the at least one person; and
- training a second machine learning model with photoplethysmogram data and corresponding radar data and wherein the determining at least one vital sign of at least one person from the extracted reflection data used the trained second machine learning model.

2. The method of claim 1, wherein the first machine learning model includes a self-supervised similarity model.

3. The method of claim 1, further comprising clustering the extracted reflection data based on vital signs determined from the extracted reflection data and wherein the identifying uses a first cluster of extracted reflection data from the clustering.

4. The method of claim 3, further comprising identifying a second person using a second cluster of extracted data from the clustering.

5. The method of claim 3, further comprising identifying a number of persons in a field of view of the emitted radar signal based on the clustering.

6. The method of claim 1, further comprising transferring learning to the first machine learning model from a database of vital signs.

7. The method of claim 6, wherein the first machine learning model is trained with contrastive learning.

8. The method of claim 1, wherein the extracted reflection data includes data from direct reflections and multipath reflections from the identified person.

9. The method of claim 1, wherein classifying reflection data as direct path reflection or multipath reflection is based on a computed angle of arrival and a computed angle of departure.

10. A non-transitory computer-readable storage medium, the computer-readable storage medium including instructions that when executed by a radar system, cause the radar system to:
- emit a radar signal;
- receive backscattered radar signals;
- extract reflection data from the backscattered radar signal;
- determine at least one vital sign of at least one person from the extracted reflection data;
- identify the at least one person by using a first machine learning model to provide a similarity score between the determined at least one vital sign and at least one vital sign from previously collected vital signs of the at least one person; and
- train a second machine learning model with photoplethysmogram data and corresponding radar data and wherein the determining at least one vital sign of at least one person from the extracted reflection data used the trained second machine learning model.

11. A radar apparatus comprising:
- at least one processor;
- a radar; and
- a non-transitory memory storing instructions that, when executed by the at least one processor, configure the apparatus to:

emit a radar signal with the radar;

receive backscattered radar signals with the radar;

extract reflection data from the backscattered radar signal;

determine at least one vital sign of at least one person from the extracted reflection data;

identify the at least one person by using a first machine learning model to provide a similarity score between the determined at least one vital sign and at least one vital sign from previously collected vital signs of the at least one person; and train a second machine learning model with photoplethysmogram data and corresponding radar data and wherein the determining at least one vital sign of at least one person from the extracted reflection data used the trained second machine learning model.

12. The apparatus of claim 11, wherein the first machine learning model includes a self-supervised similarity model.

13. The apparatus of claim 11, wherein the instructions further configure the apparatus to train a second machine learning model with photoplethysmogram data and corresponding radar data and wherein the determining at least one vital sign of at least one person from the extracted reflection data used the trained second machine learning model.

14. The apparatus of claim 13, wherein the instructions further configure the apparatus to cluster the extracted reflection data based on vital signs determined from the extracted reflection data and wherein the identifying uses a first cluster of extracted reflection data from the clustering.

15. The apparatus of claim 14, wherein the instructions further configure the apparatus to identify a second person using a second cluster of extracted data from the clustering.

16. The apparatus of claim 14, wherein the instructions further configure the apparatus to identify a number of persons in a field of view of the emitted radar signal based on the clustering.

17. The apparatus of claim 11, wherein the instructions further configure the apparatus to transfer learning to the first machine learning model from a database of vital signs.

18. The apparatus of claim 17, wherein the first machine learn model is trained with contrastive learning.

19. The apparatus of claim 11, wherein the instructions further configure the apparatus to:

(i) determine a parameter associated with an activity of daily life or sleep of the at least one person based on the received backscattered radar signals; and (ii) prescribe an action that, when carried out, modifies the parameter, resulting in an improvement of the activity of daily life or the sleep.

* * * * *